(12) United States Patent
Shimizu et al.

(10) Patent No.: US 6,223,847 B1
(45) Date of Patent: May 1, 2001

(54) AUTOMATIC STEERING APPARATUS FOR VEHICLE

(75) Inventors: Yasuo Shimizu; Katsuhiro Sakai, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/059,384

(22) Filed: Apr. 14, 1998

(30) Foreign Application Priority Data

Apr. 15, 1997 (JP) .................................................. 9-097603
Dec. 25, 1997 (JP) .................................................. 9-357996

(51) Int. Cl.[7] ...................................................... B62D 1/00
(52) U.S. Cl. ........................ 180/204; 116/28 R; 180/446; 318/587
(58) Field of Search .................................... 180/204, 167, 180/168, 169, 199, 401, 446; 280/761; 340/932.2, 479.3, 491.3, 478.1, 435; 116/204, 205, DIG. 43, 35 R, 36, 42, 28 R; 318/587; 33/264; 701/25

(56) References Cited

U.S. PATENT DOCUMENTS

| | | | |
|---|---|---|---|
| 3,117,642 | * | 1/1964 | Larinof ................................ 180/204 |
| 4,016,653 | * | 4/1977 | Bartlett ................................ 33/264 |
| 4,257,706 | * | 3/1981 | Smith ..................................... 356/3 |
| 4,755,791 | * | 7/1988 | Kuroda ................................ 340/115 |
| 4,823,471 | * | 4/1989 | Van Schaack ........................ 33/284 |
| 4,941,263 | * | 7/1990 | Hirshberg ............................ 33/264 |
| 5,052,113 | * | 10/1991 | Aquino ................................ 33/264 |
| 5,742,141 | * | 4/1998 | Czekaj ............................... 318/587 |
| 5,764,015 | * | 6/1998 | Shimizu et al. .................... 180/443 |
| 5,945,799 | * | 8/1999 | Shimizu et al. .................... 318/587 |

FOREIGN PATENT DOCUMENTS 3-74256  3/1991  (JP) .
4-55168  2/1992  (JP) .

* cited by examiner

*Primary Examiner*—Anne Marie Boehler
(74) *Attorney, Agent, or Firm*—Arent Fox Kintner Plotkin & Kahn PLLC

(57) ABSTRACT

If a driver starts an automatic parking control operation with a vehicle V stopped at a starting position, the vehicle V is guided from the starting position via a reversing position to a target position. Left and right markers are provided on the vehicle V. The vehicle V can be stopped at the starting position by aligning any of the markers with the center line of a parking position.

4 Claims, 16 Drawing Sheets

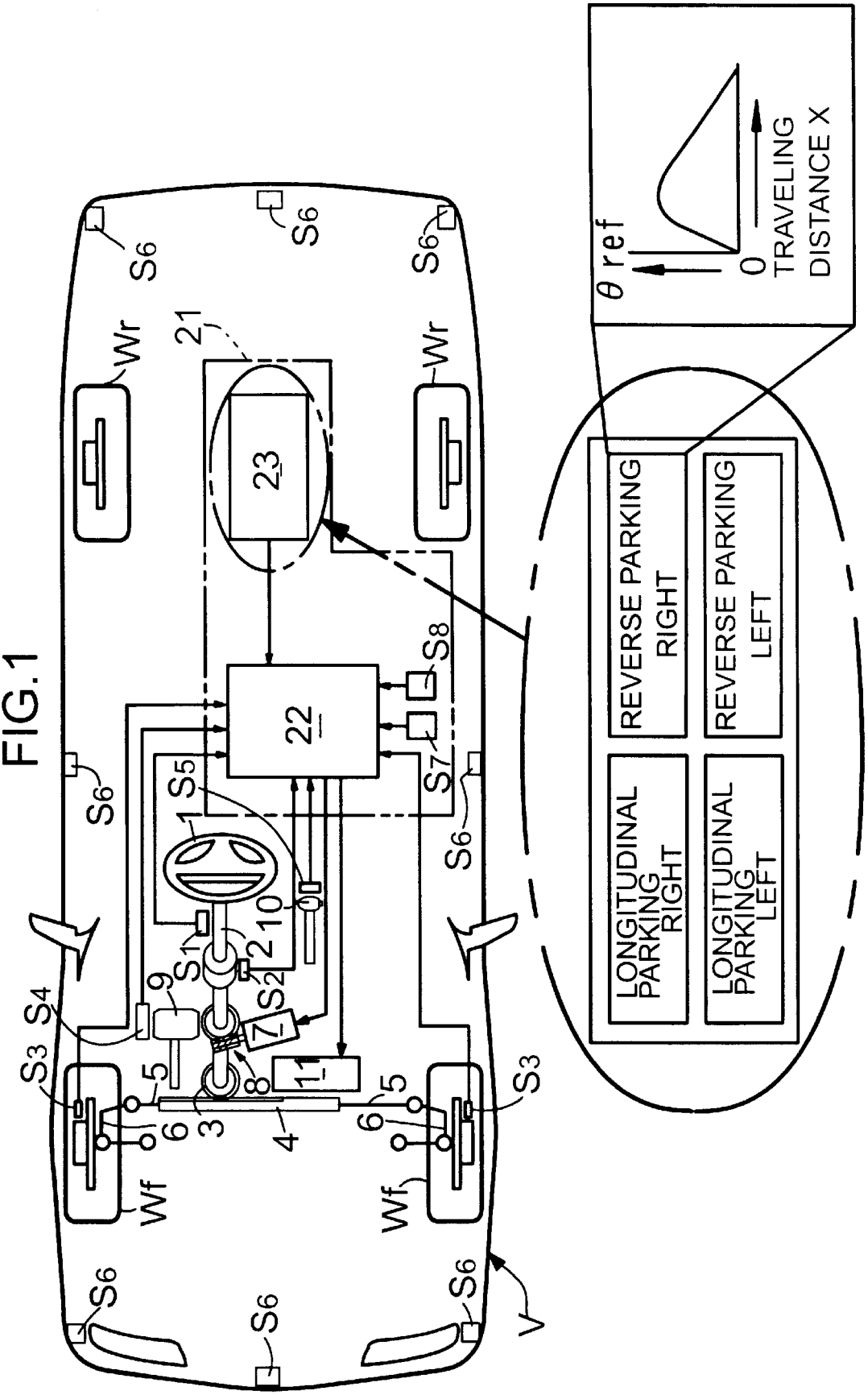

AUTOMATIC STEERING APPARATUS FOR VEHICLE

BACKGROUND OF THE INVENTION

1. Field of the Invention

The present invention relates to an automatic steering apparatus for a vehicle, to automatically park the vehicle without recourse to steering by a driver.

2. Description of the Related Art

Automatic steering apparatuses for vehicles are already known from Japanese Patent Application Laid-open Nos. 3-74256 and 4-55168. These automatic steering apparatuses for vehicles utilize an actuator of a conventionally well-known electrically powered steering device, and are adapted to automatically carry out reverse parking and longitudinal parking of a vehicle by controlling the actuator based on a relationship between distance of movement of the vehicle and a steering angle which are stored in advance.

When the automatic parking operation is to be carried out by the automatic steering apparatus, the vehicle is first stopped at a starting position, which is in a given positional relationship to a target or completion position at which the vehicle is to be parked. The automatic parking control operation is then started at the starting position. Therefore, if the vehicle is not correctly stopped, a deviation is generated from the target position which the vehicle reaches using the automatic parking control operation. However, in the prior art, a driver stops the vehicle at the starting position by visual estimation of the starting position. Hence, it is difficult to avoid an error due to a deviation in the starting position.

SUMMARY OF THE INVENTION

Accordingly, it is an object of the present invention to ensure that a driver can easily and correctly stop the vehicle at the starting position.

To achieve the above object, according to an aspect and feature of the present invention, there is provided an automatic steering apparatus for a vehicle, comprising a movement locus determining means for storing or calculating a locus of movement of the vehicle to a target position, an actuator for steering the wheels of the vehicle, and a control means for controlling the driving of the actuator based on the locus of movement determined by the movement locus determining means to move the vehicle, which is stopped at a starting position, to the target position. A marker is provided for stopping the vehicle at the starting position.

With the above arrangement, the driver can easily and correctly stop the vehicle at the starting position based on the marker.

In addition to the above feature, the marker is provided on the vehicle. Thus, it is unnecessary to provide a marker at every parking position, resulting in enhanced convenience.

In addition to the above feature, the marker emits light or sound. Thus, the driver can reliably perceive the marker.

In addition to the above feature, the marker emits light or sound by operating a manual switch. Thus, the driver enables the marker to emit light or sound when required.

In addition to the above feature, the marker is placed into a visually perceivable position by operating a manual switch. Thus, the driver can visually perceive the marker when required. Also by placing the marker into the visually non-perceivable position, the marker can be prevented from obstructing the field of view of the driver or from degrading the appearance of the vehicle.

In addition to the above feature, the manual switch may be a switch for selecting any of a plurality of loci of movement stored in the movement locus determining means. Thus, when the driver selects a desired locus of movement, the marker corresponding to such a locus of movement can emit light or sound.

In addition to the above feature, when the vehicle starts to move from the starting position, the emission of light or sound from the marker is stopped. Thus, it is unnecessary for the driver to stop the emission of light or sound, resulting in enhanced convenience.

In addition to the above feature, when the vehicle starts to move from the starting position, the marker is automatically brought into a visually non-perceivable position. Thus, it is unnecessary to bring the marker into the visually non-perceivable position by the driver, resulting in enhanced convenience.

In addition to the above feature, the marker is provided on the vehicle, so that when a predetermined relationship between the marker and an object outside the vehicle is satisfied, the vehicle is stopped at the starting position. Thus, the vehicle can be stopped easily and correctly at the starting position by aligning the marker, which is provided on the vehicle, with an object which is provided outside the vehicle.

In addition to the above feature, a plurality of the markers are provided on the vehicle. Thus, the vehicle can be stopped easily and correctly at the starting position by using the plurality of markers.

In addition to the above feature, the movement locus determining means determines the locus of movement as a steering angle of the wheel relative to a traveling distance of the vehicle. Thus, a constant locus of movement can be ensured irrespective of magnitude of the vehicle speed during the automatic steering control operation.

In addition to the above feature, the automatic steering apparatus includes a brake input means which is operated by the driver. The control means permits the driving of the actuator based on the condition that the brake input means is operated. Thus, when the vehicle is about to interfere with an obstacle during an automatic steering control operation, the brake device can be immediately operated to stop the vehicle.

The above and other objects, features and advantages of the invention will become apparent from the following description of the preferred embodiment taken in conjunction with the accompanying drawings.

BRIEF DESCRIPTION OF THE DRAWINGS

FIG. 1 shows an overview of a vehicle provided with an automatic steering apparatus, the storage area divided into four areas, and an example of data stored in each area;

DETAILED DESCRIPTION OF THE PREFERRED EMBODIMENTS

Figure 2A:
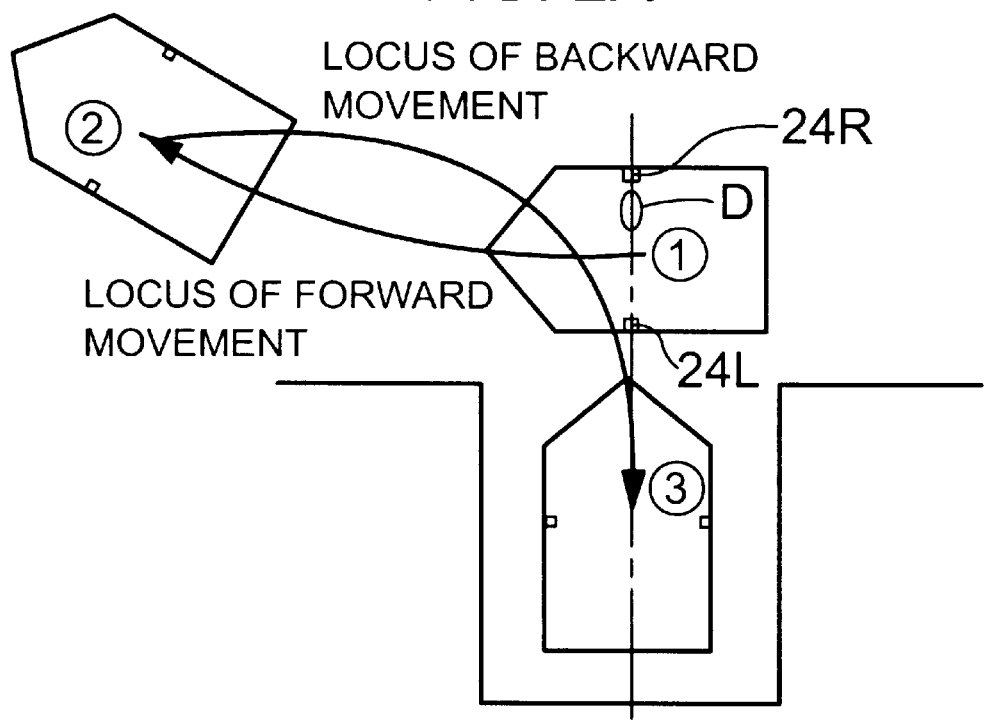
FIGS. 2A and 2B show automatic parking control for reverse parking/left mode.

The present invention will now be described by way of an embodiment with reference to the accompanying drawings.

As shown in FIG. 1, a vehicle V includes a pair of front wheels Wf, Wf and a pair of rear wheels Wr, Wr. A steering wheel 1 and the front wheels Wf, Wf, which are steering wheels, are connected together via a steering shaft 2 which is rotated with the steering wheel 1. A pinion 3 is provided at a lower end portion of the steering shaft 2. A rack 4 is meshed with the pinion 3. Left and right tie rods 5, 5 are provided on ends of the rack 4, and left and right knuckles 6, 6 are linked to the tie rods 5, 5. To assist the driver in operating the steering wheel 1, or to carry out an automatic steering operation for garaging of the vehicle (which will be described hereinafter), a steering actuator 7, comprising an electric motor, is coupled to the steering shaft 2 via a worm gear mechanism 8.

A steering control unit 21 comprises a controller 22 and a storage means 23. The controller 22 is adapted to receive signals from a) a steering angle detecting means $S_1$ for detecting a steering angle of the front wheels Wf, Wf based on an angle of rotation of the steering wheel 1, b) a detector means $S_2$ for detecting a steering torque of the steering wheel 1, c) detector means $S_3$, $S_3$ for detecting angles of rotation of the left and right front wheels Wf, Wf, d) a detector means $S_4$ for detecting the amount of operation of a brake pedal 9 as a brake input means, e) a shift range detecting means $S_5$ for detecting the shift range ("D" range, "R" range, "N" range, "P" range or the like) selected by a select lever 10, and f) eight object detecting means $S_6$ mounted at a front portion, a central portion and a rear portion of the vehicle V. The object detecting means $S_6$ may be any known sonar, radar, television camera or the like. Lines connecting the eight object detecting means $S_6$ and the controller 22 are omitted for the purpose of simplifying the drawings. The controller 22 constitutes a control means of the embodiment of the present invention, and the storage means 23 constitutes a movement locus setting means of the embodiment of the present invention.

Figure 5:
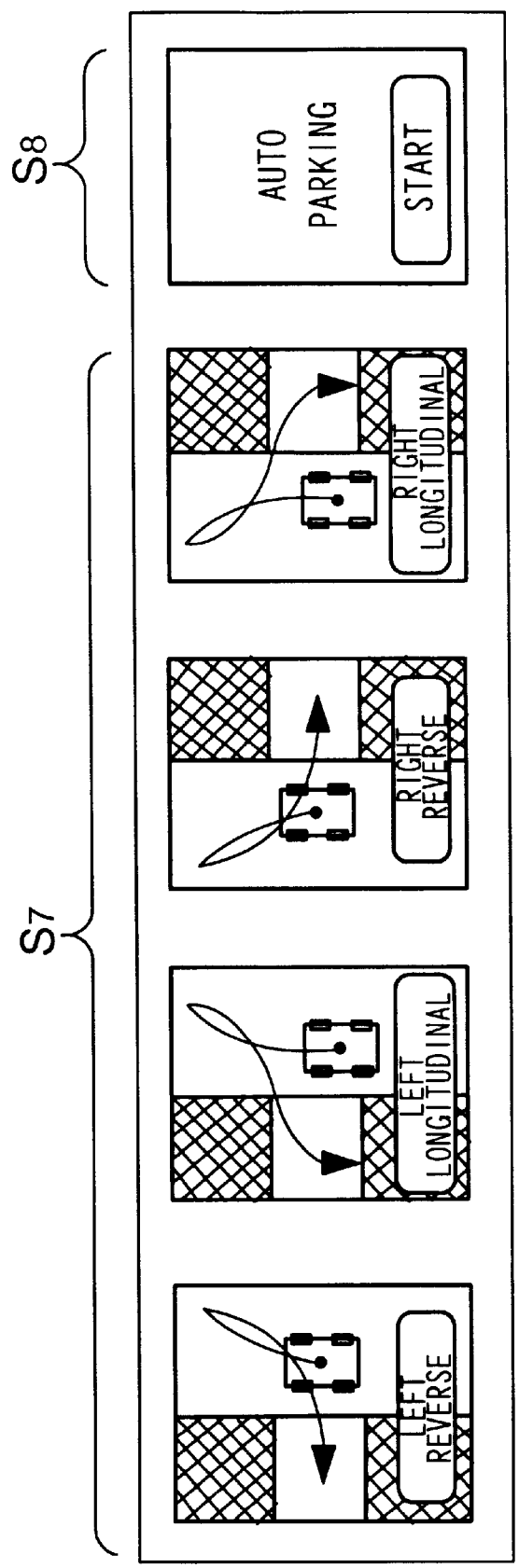
FIG. 5 shows the mode selection switch and automatic parking starting switch.
Figure 6:
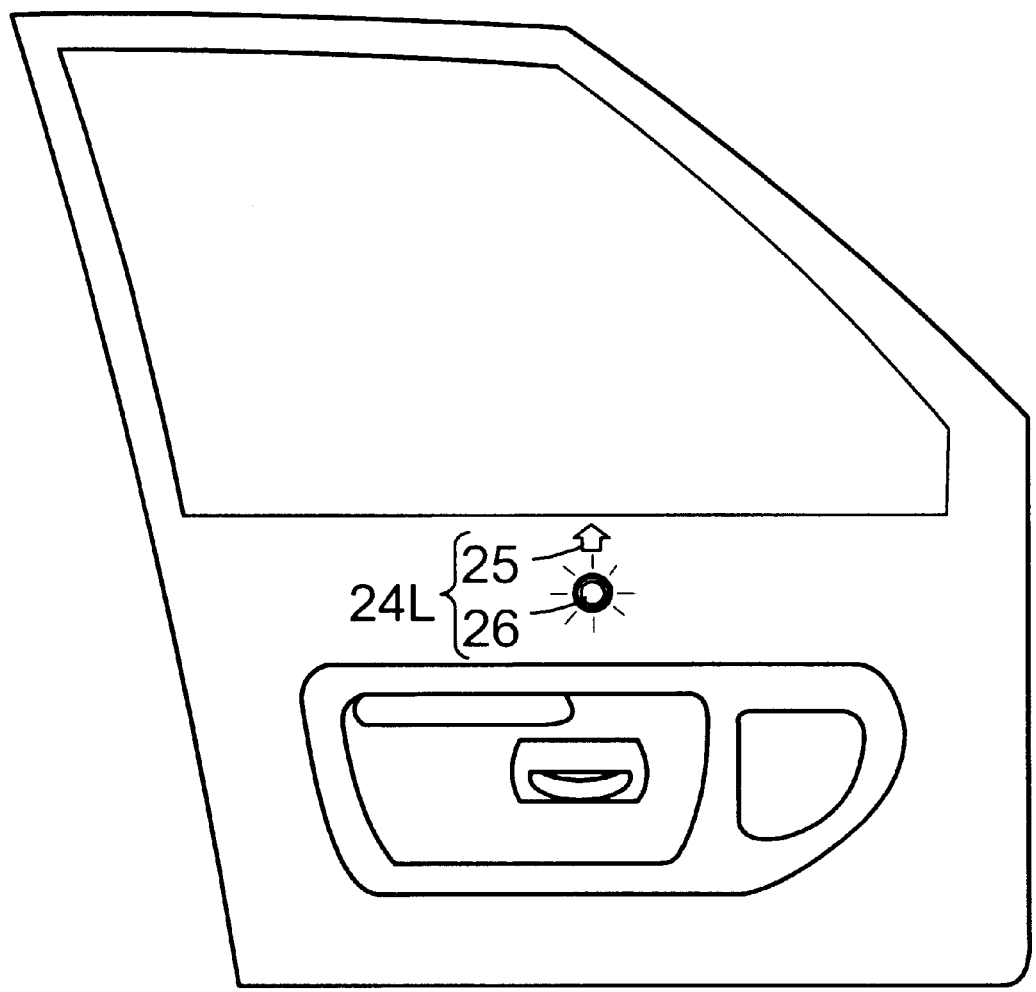
FIG. 6 shows a modification of the marker.

A mode selecting switch $S_7$, operated by the driver, and an automatic parking starting switch $S_8$ are also connected to the controller 22. As can be seen from FIG. 5, the mode selecting switch $S_7$ is operated for selecting any of four parking modes: a reverse-parking/right mode, a reverse-parking/left mode, a longitudinal parking/right mode, and a longitudinal parking/left mode. The mode selecting switch $S_7$ includes four buttons which correspond to the four modes. The automatic parking starting switch $S_8$ is operated when an automatic parking operation is started in any mode selected by the mode selecting switch $S_7$. The mode selecting switch $S_7$ constitutes a manual switch of the embodiment of the present invention.

Data for the four parking mode, i.e., the relationship between the traveling distance X of the vehicle and a standard steering angles ref, is stored as a table in advance in the storage means 23. The traveling distance X of the vehicle V is determined by multiplying the already-known circumferential length of the front wheel Wf by the angle of rotation of the front wheel Wf detected by the front wheel rotational-angle detecting means $S_3$, $S_3$. To calculate the traveling distance X, a high selected value, a low selected value or an average value of two values is calculated based on the outputs from the pair of left and right front wheel rotational angle detecting means $S_3$, $S_3$.

The controller 22 controls the operation of the steering actuator 7 and the operation of an operation stage display unit 11 including a liquid crystal monitor, a speaker, a lamp, a chime, a buzzer or the like, based on the signals from the detecting means $S_1$ to $S_6$ and the switches $S_7$ and $S_8$, and the data for the parking modes stored in the storage means 23.

Figure 3:
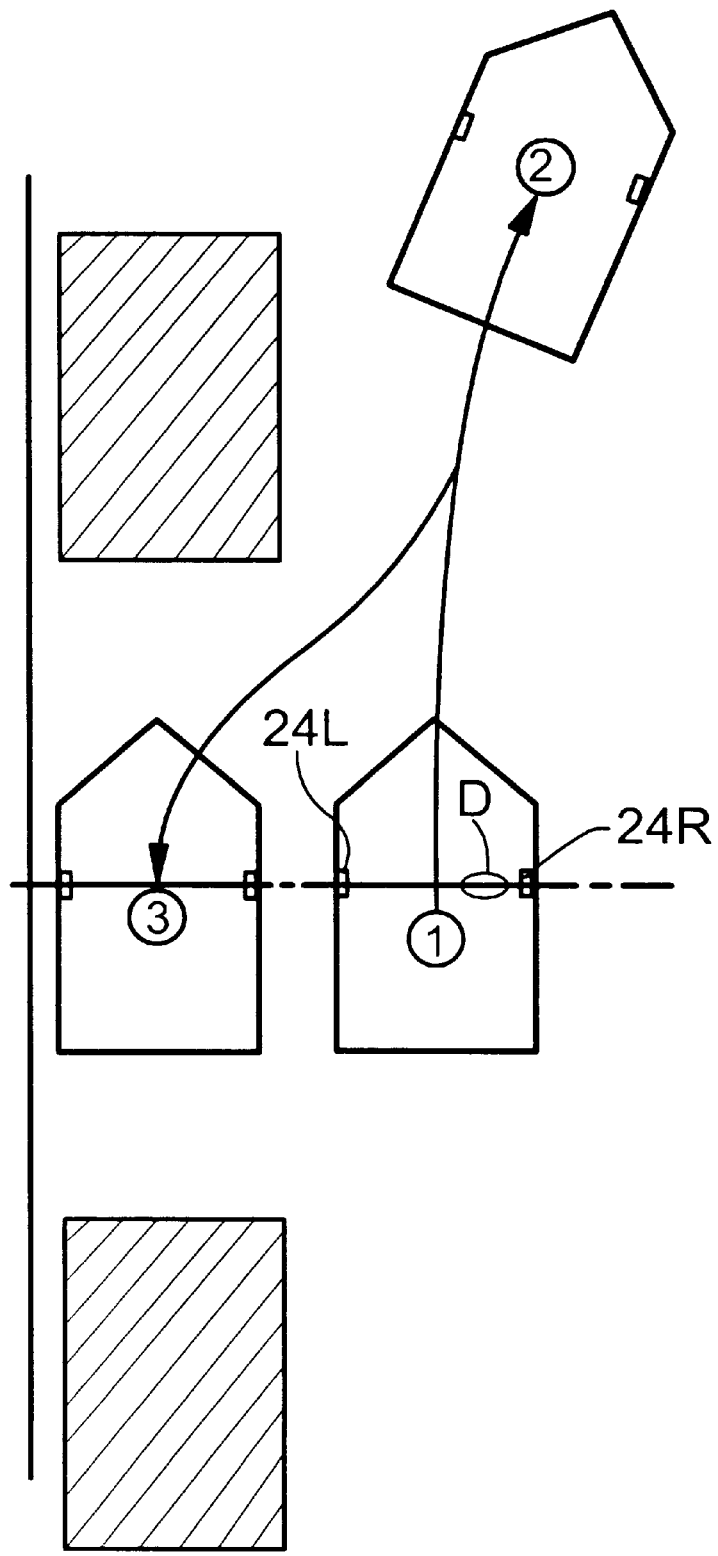
FIG. 3 shows automatic parking control for longitudinal parking/left mode.
Figure 4:
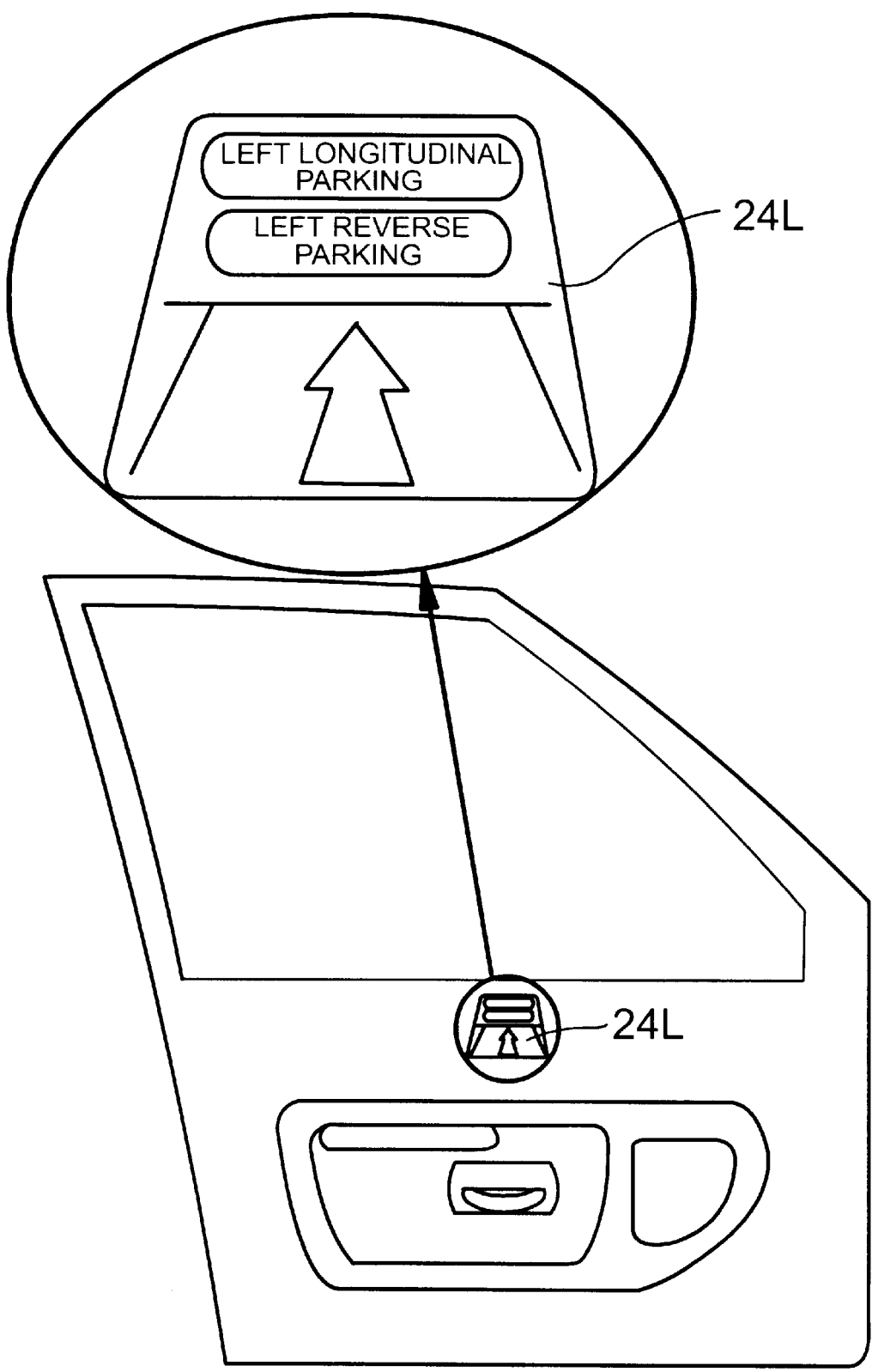
FIG. 4 shows one embodiment of a left marker.

As can be seen from FIG. 4, a marker 24L comprising a sticker is provided on a left door at a front portion of the vehicle V beside a driver's seat. If the marker 24L is located on a center line of a parking position when the vehicle is to be stopped at a starting position (1) to carry out the automatic parking in the reverse parking/left mode as shown in FIG. 2A, the vehicle can be stopped correctly at the starting position (1). If the marker 24L is located on the center line of the parking position when the vehicle V is also to be stopped at the starting position (1) to carry out the automatic parking in the longitudinal parking/left mode as shown in FIG. 3, the vehicle V can be stopped correctly at the starting position (1). A right marker 24R is provided on a right door at the front portion of the vehicle V at a location symmetric with the marker 24L. When the vehicle V is stopped at the starting position (1) to carry out the automatic parking in the reverse parking/right mode and the longitudinal parking/right mode, the right marker 24R is located on the center line of the parking position.

The left and right markers 24L and 24R are provided just beside the driver D. Hence, it is possible for the driver to check whether the markers 24L and 24R lie on the center line of the parking position, and it is possible to correctly stop the vehicle V at the starting position (1).

The operation of the embodiment of the present invention having the above-described arrangement will be described below.

In a normal operation (the automatic parking starting switch $S_8$ is not on), i.e., when automatic parking operation is not carried out, a steering control unit 21 functions as a general power steering control unit. Specifically, when the driver D operates the steering wheel 1 so as to turn the vehicle V, the steering torque detecting means $S_2$ detects the steering torque applied to the steering wheel 1, and the controller 22 controls the driving of the steering actuator 7 based on the steering torque. As a result, the left and right front wheels Wf, Wf are steered by the driving force of the steering actuator 7, thereby assisting the steering operation of the driver.

The contents of the automatic parking control operation will now be described taking as an example the reverse parking/left mode (mode in which the vehicle V is parked in a parking position on the left of the vehicle V, as the vehicle is moved backwards).

First, as shown in FIG. 2A, the vehicle V is moved to a position in the vicinity of a garage in which the vehicle V is to be parked, and the vehicle is stopped at that position (the starting position 1) at which the left marker 24L is aligned with a center line of the garage with the left side of the vehicle body as close as possible to an entrance line of the garage. Then, when the mode selecting switch $S_7$ is operated to select the reverse parking/left mode and the automatic parking starting switch $S_8$ is turned on, the automatic parking control operation is started. While the automatic parking control operation is carried out, the actual position of the subject vehicle, obstacles around the vehicle, the parking position, the predicted locus of movement of the vehicle from the starting position to the parking position, and the position at which the forward movement of the vehicle is changed to the backward movement thereof are displayed on the operation stage display unit 11, and various kinds of instructions and alarms such as instructions to operate the selecting lever 10 at the reversing position and the like are given vocally from the speaker to the driver D.

The automatic parking control operation ensures that the front wheels Wf, Wf are automatically steered based on data for the reverse parking/left mode selected by the mode selecting switch $S_7$, by freeing the brake pedal 9 only enough to permit the vehicle to creep, even if the driver does not operate the steering wheel 1. Namely, while the vehicle travels forward from the starting position (1) to the reversing position (2), the front wheels Wf, Wf are automatically steered rightwards and while the vehicle V travels backwards from the reversing position (2) to a target or completion position (3), the front wheels Wf, Wf are automatically steered leftwards.

Figure 2B:
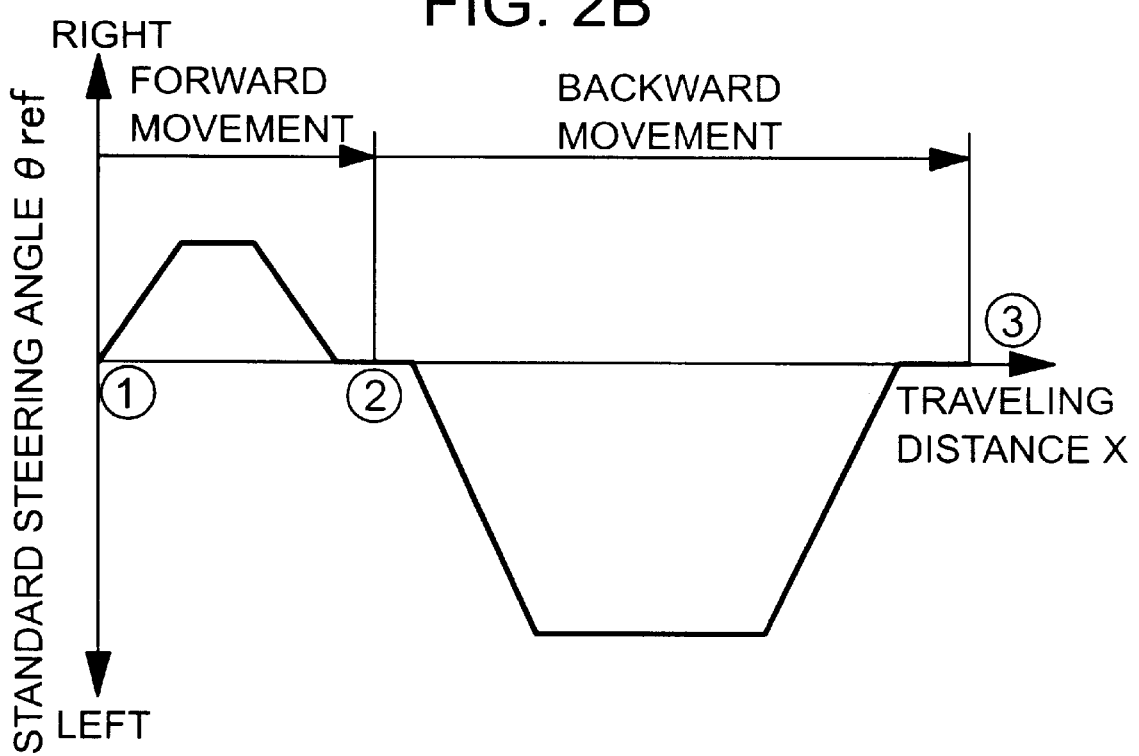

As shown in FIG. 2B, while the automatic steering operation is carried out, the controller 22 a) calculates the deviation E (=ref-) based on the standard steering angle ref in the reverse parking/left mode read from the storage means 23 and the steering angle input from the steering angle detecting means $S_1$, and b) controls the operation of the steering actuator 7 so that the deviation E becomes zero. In this case, the standard steering angle ref is set to correspond to the traveling distance X of the vehicle V. Hence, even if the vehicle speed of the creeping vehicle is slightly varied, the vehicle V always travels along the above-described locus of movement.

The automatic parking control operation is carried out while the vehicle V creeps with the brake pedal 9 depressed by the driver D. Therefore, when the driver D sees an obstacle, the vehicle V can be stopped immediately by the driver D depressing the brake pedal 9.

The above-described automatic parking control operation is canceled when the driver D turns off the mode selecting switch $S_7$. In addition to this, when the driver D releases the brake pedal 9, when the driver D operates the steering wheel 1, or when any of the object detecting means $S_6$ detects an obstacle, the automatic parking control operation is canceled, restoring the usual power steering control operation.

Modifications to the markers 24L and 24R as shown in FIGS. 6 to 11 are considered. The marker shown in FIG. 6 includes a lamp 26 (or a light emitting diode) in addition to an arrow 25 indicating a reference point. When the driver D operates the mode selecting switch $S_7$ prior to stopping of the vehicle V at the starting position, the lamp of the marks 24L, 24R corresponding to the selected mode is lit or flashed. Thus, it is possible to precisely indicate the marker 24L, 24R to be used by the driver D. In place of emission of light from the lamp 26 by operating the mode selecting switch $S_7$, the lamp 26 may be lit by an exclusively provided manual switch.

Figure 7:
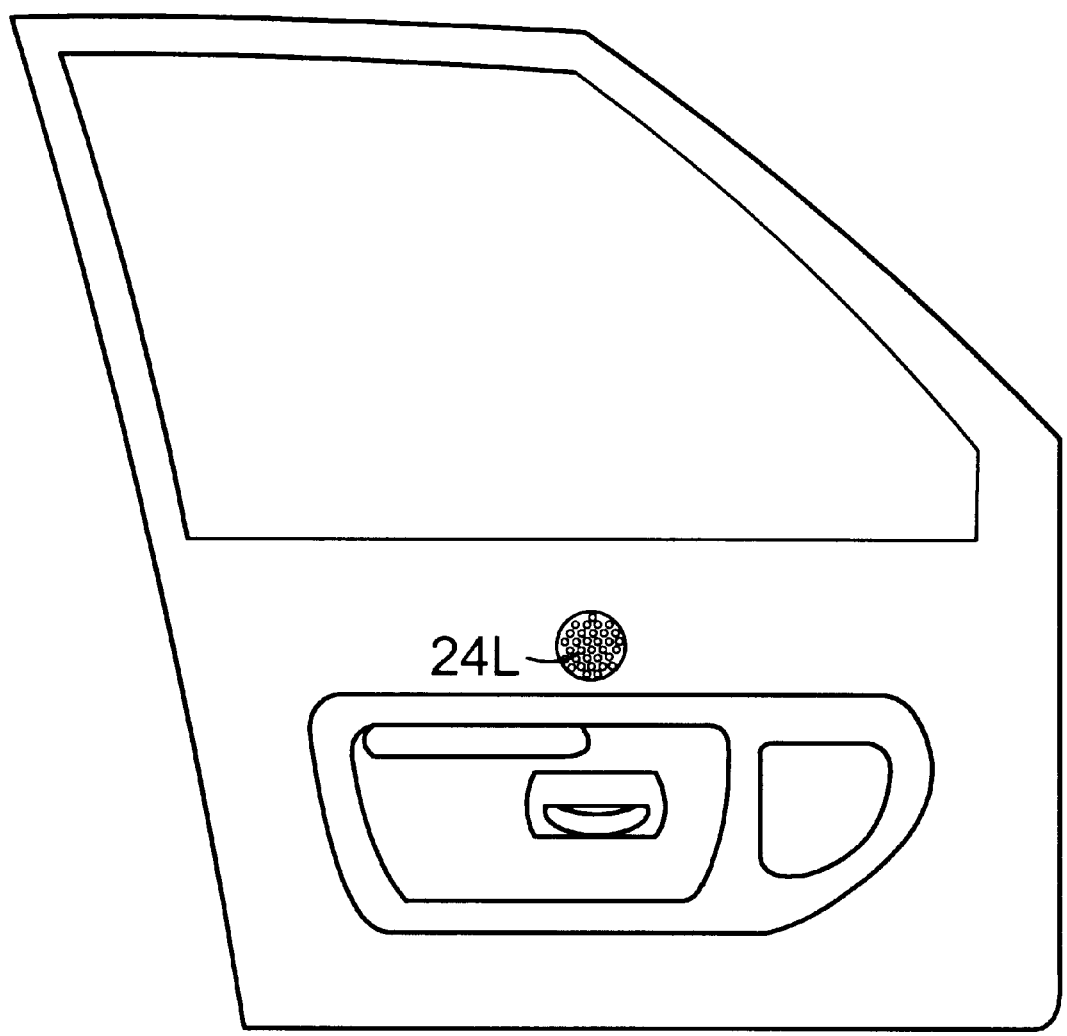
FIG. 7 shows another modification of the marker.

A marker 24L comprising a buzzer (or chime or a speaker) may be provided in place of the lamp 26 as shown in FIG. 7 and in this case, a similar function and effect can be provided. When the speaker is used, an artificial voice "align the left marker with the center of the parking position" can be provided to urge the driver to further reliably position the vehicle V.

When the vehicle V is stopped at the starting position and the automatic parking starting switch $S_8$ is operated, the automatic parking control operation is started, but the emission of light or sound from the markers 24L and 24R is automatically stopped simultaneously with the operation of the automatic parking starting switch $S_8$. Thus, even if the driver D does not carry out a special operation, it is possible to prevent the emission of light or sound from the markers 24L and 24R after starting of the automatic parking control operation.

Figure 8:
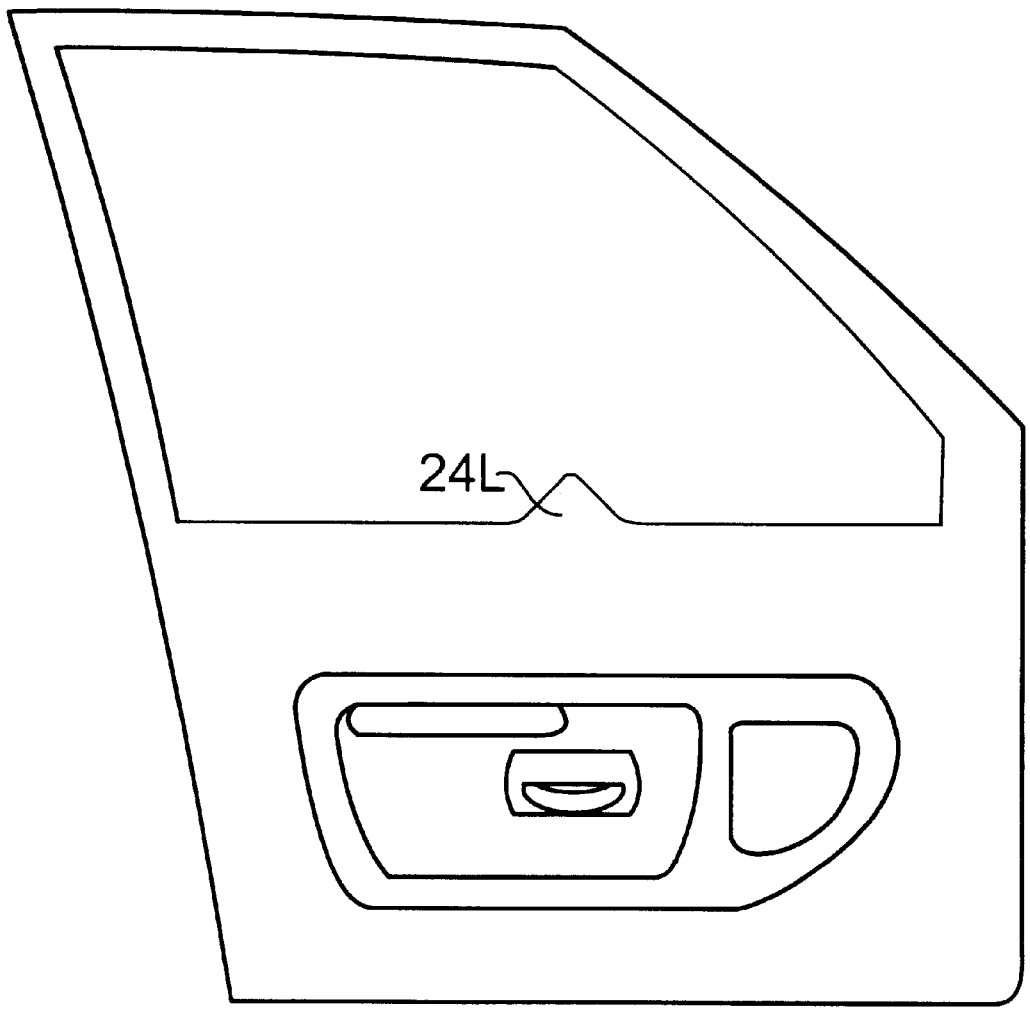
FIG. 8 shows a further modification of the marker.
Figure 9:
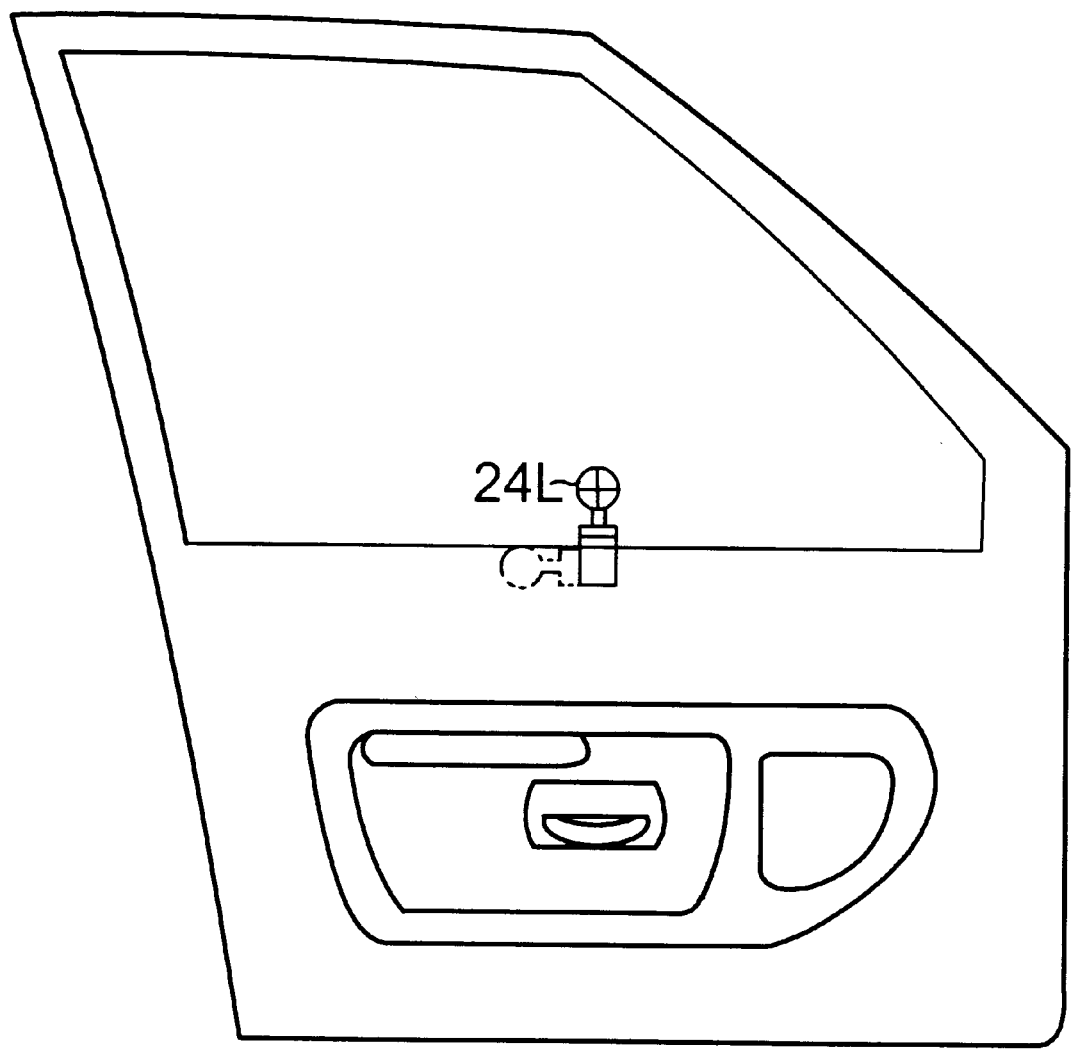
FIG. 9 shows another further modification of the marker.

FIG. 8 shows an example in which a projection is provided at a lower end of a window of a door and used as a marker 24L. FIG. 9 shows an example in which a marker 24L is provided so that it can be usually retracted in a visually non-perceivable inconspicuous position and can be protruded into a visually perceivable position by the operation of the mode selecting switch $S_7$ or an exclusively provided manual switch. It is possible to prevent the marker from obstructing the field of view of the driver by retracting the marker into a visually non-perceivable position when the marker 24L is not required.

Figure 10:
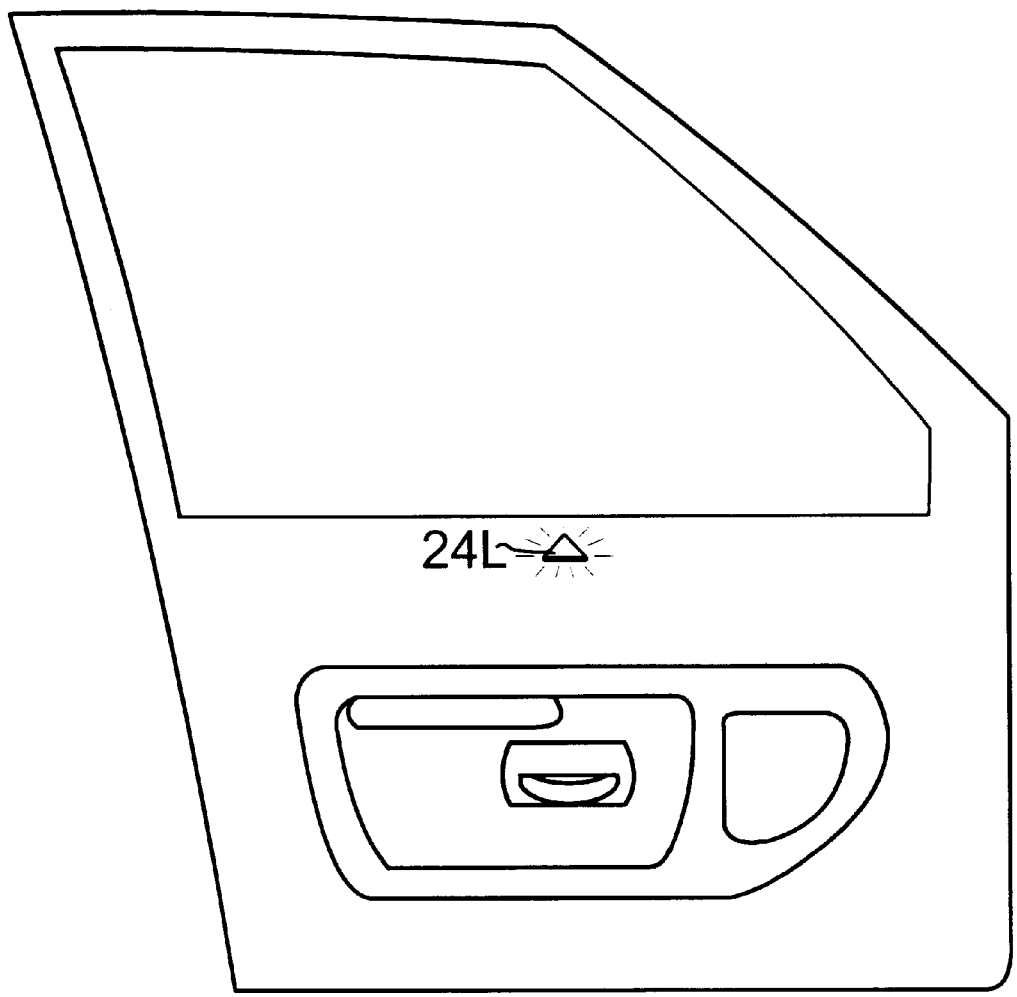
FIG. 10 shows an additional modification of the marker.
Figure 11:
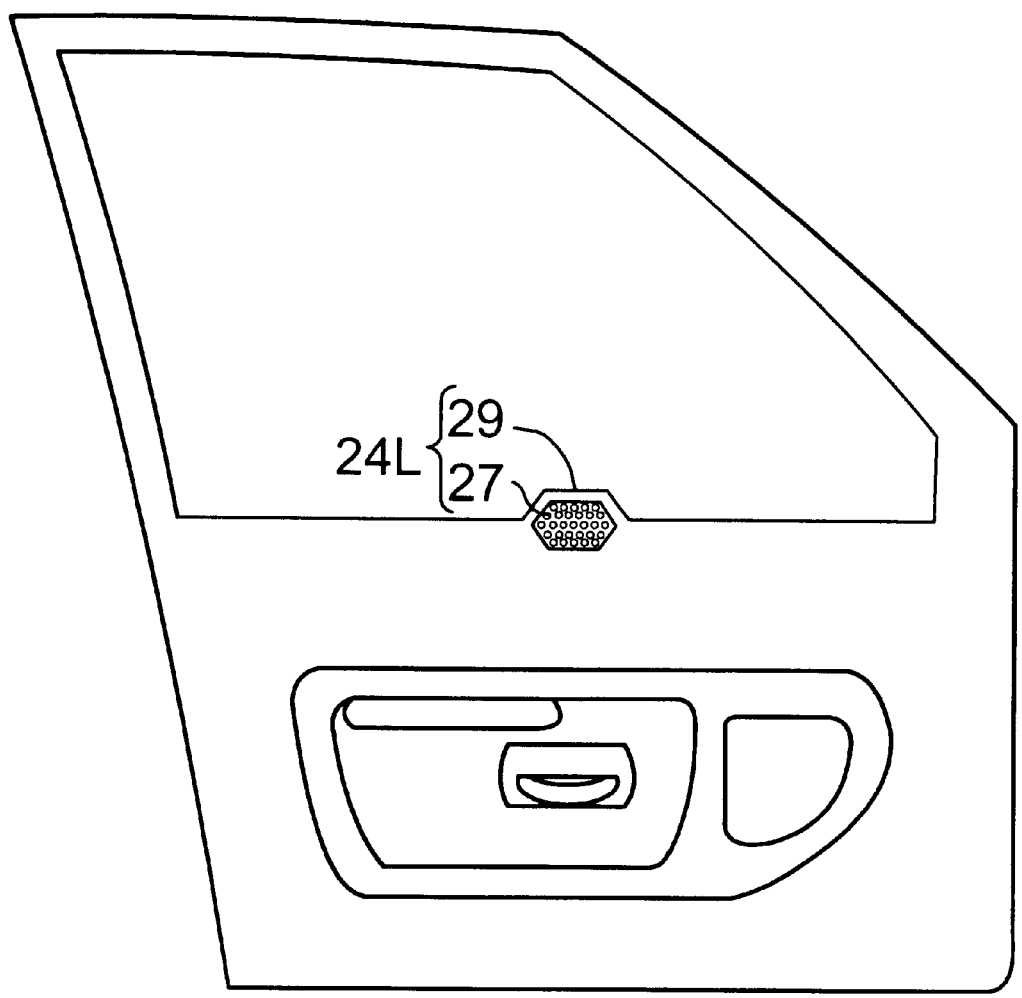
FIG. 11 shows another additional modification of the marker.

FIG. 10 shows an example in which a marker 24L emits light by a lamp or the like. If the driver D operates the mode selecting switch $S_7$ or the exclusively provided manual switch when the driver D tries to stop the vehicle V at the starting position, the marker 24L (24R) corresponding to the selected mode is lit or flashed. Thus, the marker 24L (24R) to be used can be precisely indicated to the driver D. FIG. 11 shows an example in which the marker 24L is comprised of a projection 29 which is a reference, and a buzzer (or a chime or a speaker) 27. This example is further effective, as compared with the example shown in FIG. 7.

Figure 12:
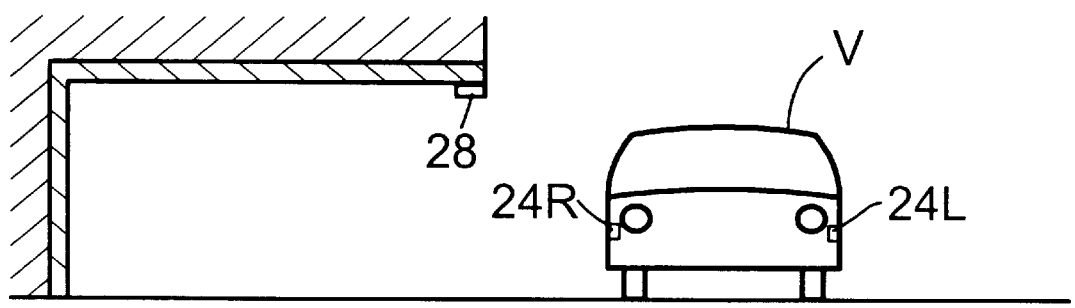
FIG. 12 shows a marker provided outside the vehicle.
Figure 13:
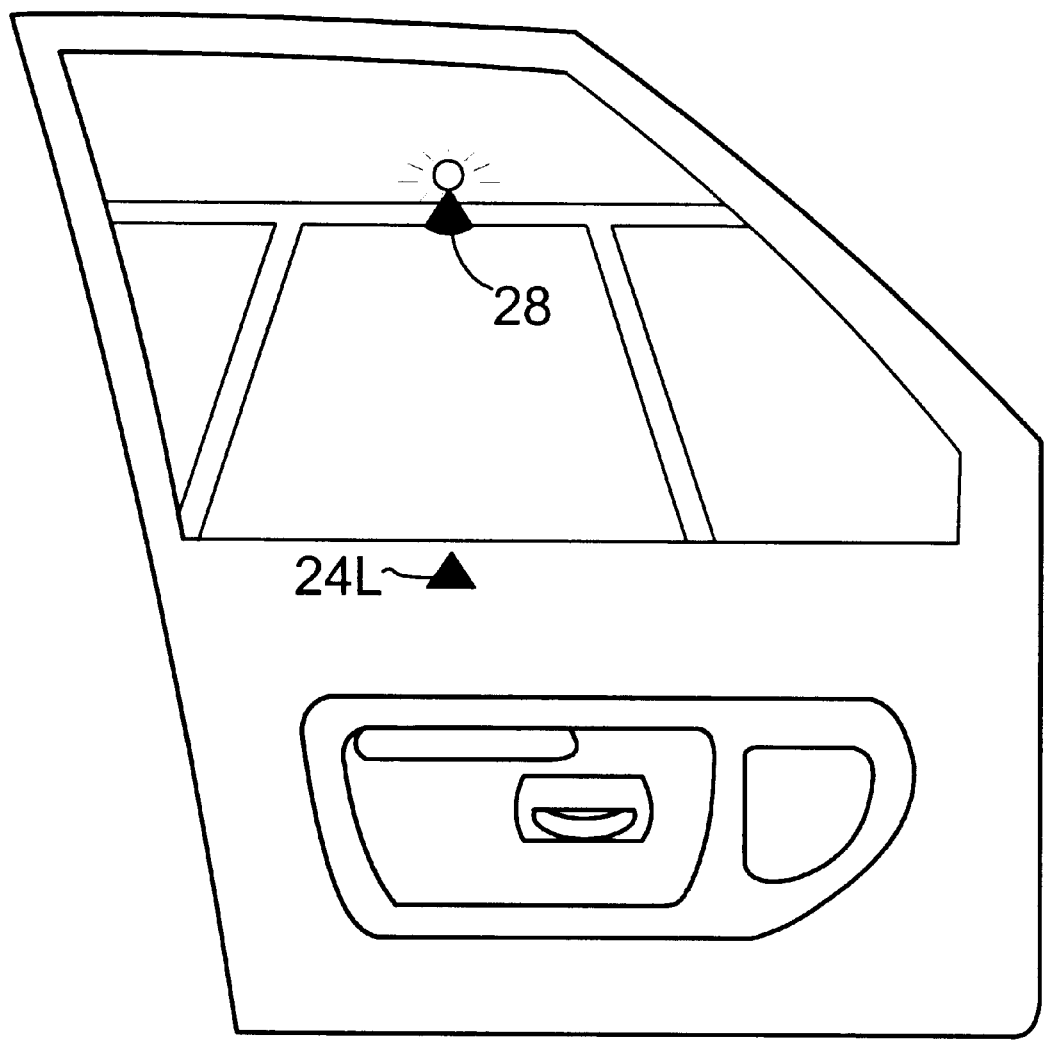
FIG. 13 shows another marker provided outside the vehicle.

FIG. 12 shows an example in which a marker 28 including a lamp is provided on the center line of a ceiling portion of an inlet of a garage. The marker 28 is designed so that the lamp is lit by receiving a signal such as an ultrasonic wave, infrared rays, an electric wave and the like when the driver D operates the mode selecting switch $S_7$ provided in the vehicle V. If the vehicle V is stopped so that the markers 24L and 24R provided on the vehicle V are aligned with the marker 28 provided in the garage, the vehicle V can be additionally correctly positioned at the starting position. A marker 28 outside the vehicle may be placed on a ground surface, as shown in FIG. 13.

In this case, the markers 24L and 24R on the vehicle V are not necessarily required. Even if the driver D aligns the driver's sheet position of the vehicle with the marker 28 in the garage, a satisfactory positioning effect can be provided. However, if the case where the markers are provided on the vehicle V is compared with the case where the markers are provided in the parking position, the provision of the markers on the vehicle V is just as effective since the markers on the vehicle V can be applied to all parking positions. The marker 28 outside the vehicle may be a marker provided with a sound emitting device such as a buzzer in place of the light emitting device such as the lamp or the like, or may be a simple mark.

By placing the marker 28 outside the vehicle as described above, the marker 28 outside the vehicle is a target for alignment of the markers 24L and 24R in the vehicle. Hence, the vehicle V can be additionally correctly stopped at the starting position. However, the cost to place the marker 28 in all garages where the vehicle is to be parked may be high, and it is problematic to place the marker 28 each time the vehicle is parked since the driver must get out of the vehicle whenever the vehicle is to be parked. Therefore, if a white line necessarily provided in a common garage is utilized as a marker 28, the vehicle V can be stopped with good accuracy at a starting position in each different type of garage.

Figure 14:
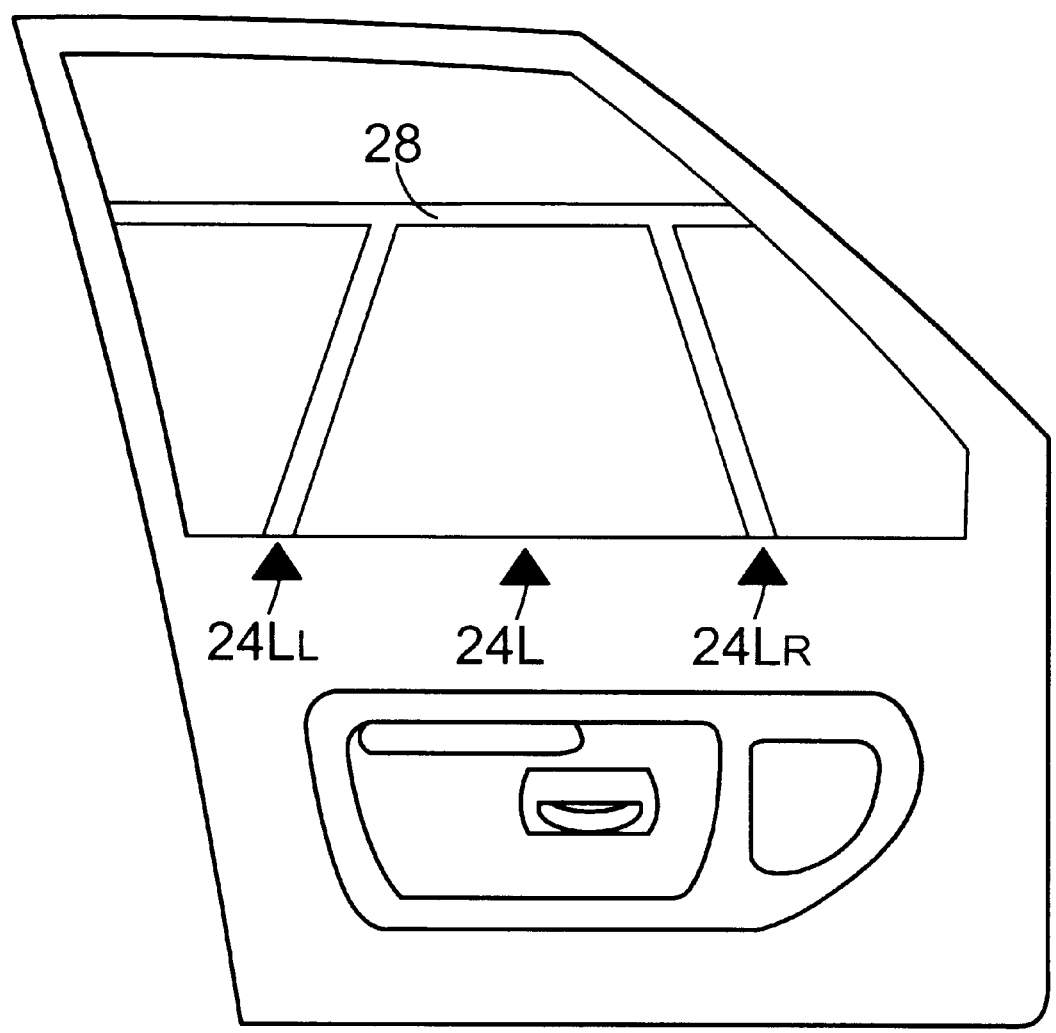
FIG. 14 shows another modification of the marker.
Figure 15:
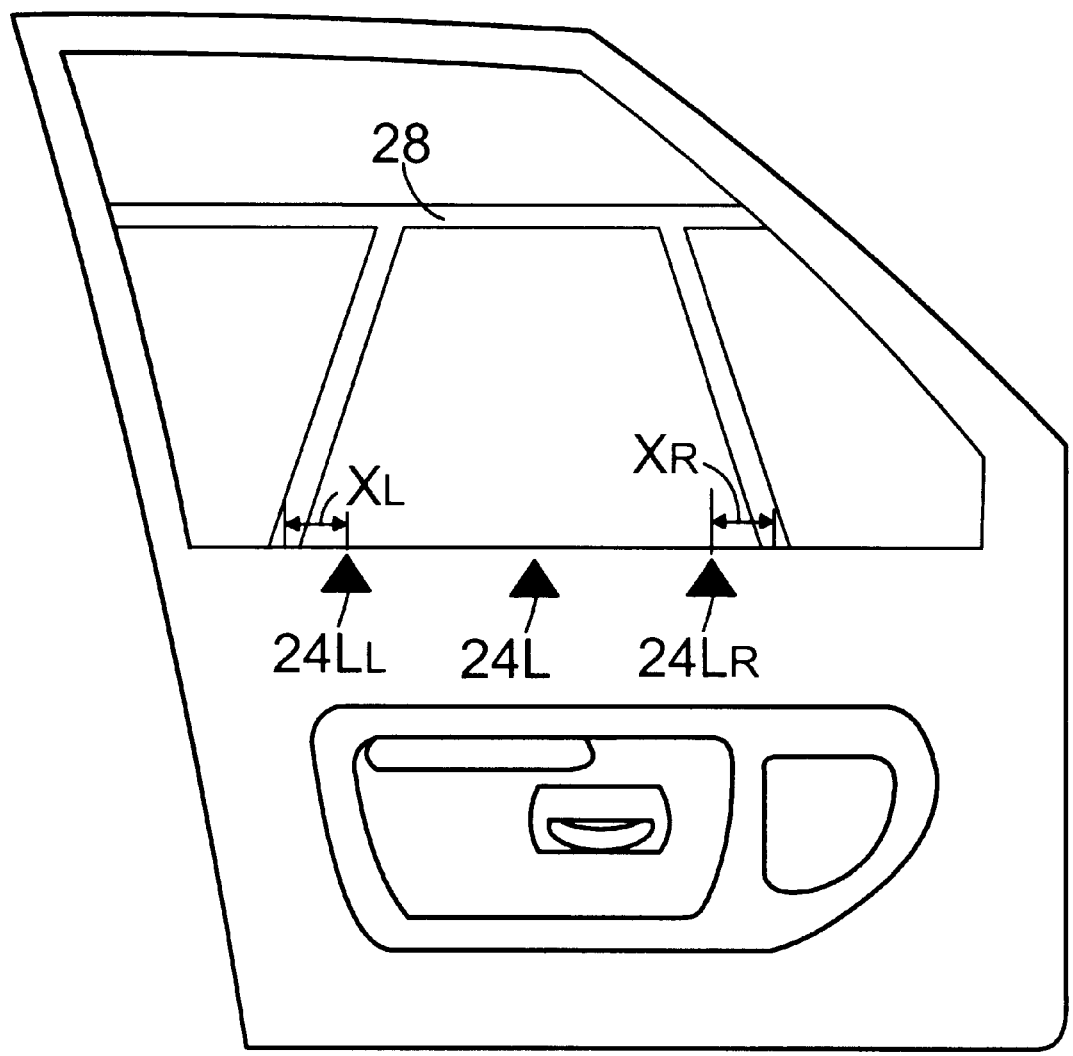
FIG. 15 shows an example of using the marker of FIG. 14.

An embodiment shown in FIG. 14 is an example in which, in addition to a marker 24L provided at the central portion of the front left door, two markers $24L_R$ and $24L_L$ are further provided in front and in rear of the marker 24L. If the two markers $24L_R$ and $24L_L$ are aligned with right and left white lines in a garage, which function as a marker 28 outside the vehicle, the central marker 24L is automatically aligned with a central portion between the right and left white lines. Even when a marker indicating the center line of a parking area does not exist outside the vehicle, the vehicle V can be stopped with good accuracy at a starting position. If the width of the parking area is wide or narrow, the distance between the right and left white lines is varied. Hence, the two markers $24L_R$ and $24L_L$ cannot be correctly aligned with the right and left white lines. However, if the distance $X_R$ between the right white line and the right marker $24L_R$ is equalized to the distance $X_L$ between the left white line and the left marker $24L_L$, as shown in FIG. 15, the vehicle V can be likewise stopped with good efficiency at a starting position.

Figure 16:
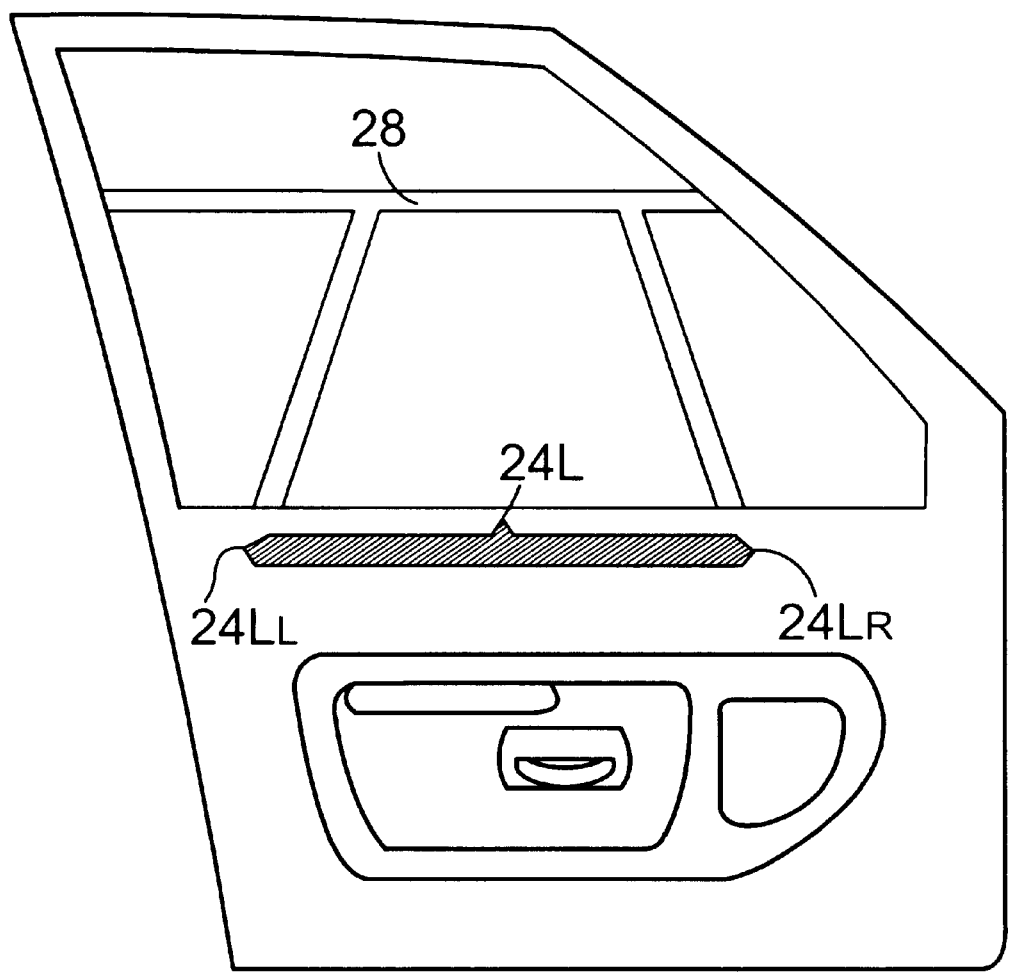
FIG. 16 shows another further modification of the marker.

If the two left and right markers $24L_R$ and $24L_L$ are provided, the central marker 24L is not required. However, when the vehicle is to be parked in a parking area having no white line, or when the vehicle is to be parked in a parking area having a marker 28 provided on the center line, the central marker 24L is required. Therefore, it is desirable that the central marker 24L is mounted on the vehicle. Even if an oblong mark (see FIG. 16) is provided on the front left door with a central projection thereof serving as a marker 24L and with left and right ends thereof serving as markers $24L_L$ and $24L_R$, a similar effect can be provided. It is of course that markers corresponding to the two markers $24L_R$ and $24L_L$ on front and rear portions of the front left door are also provided on a front right door.

Although the locus of movement of the vehicle V is previously stored in the embodiment, but can be calculated on the basis of the positional relationship between the vehicle V and the parking position. The position of provision of the marker is not limited to that in the embodiment, and the marker can be provided at any location on the vehicle V or at any location in the parking position. The markers 28 outside the vehicle may be opposite walls of a garage, or other vehicles stopped on opposite sides of the parking position. The left or right one of the markers 28 may be a white line, and the other marker may be a wall or another vehicle. Even when the white line, the wall or the other vehicle serving as the marker 28 outside the vehicle exists only on either the left or right of the parking position, if the left markers $24L_L$ in the vehicle is aligned with the left marker 28 outside the vehicle, or if the right marker $24L_R$ in the vehicle is aligned with the right marker 28 outside the vehicle, the vehicle V can be stopped with good accuracy at the starting position. Further, the markers 24L and 24R provided in the vehicle may be an image picture projected onto a door surface or a glass surface, or an image picture appearing by a hologram.

Although the embodiment of the present invention has been described in detail, it will be understood that the present invention is not limited to the above-described embodiment, and various modifications may be made without departing from the spirit and scope of the invention defined in the claims.

What is claimed is:

1. An automatic steering apparatus for a vehicle, comprising:

a movement locus determining means for one of storing and calculating a locus of movement of the vehicle to a target position;

an actuator for steering wheels of the vehicle;

a control means for controlling driving of said actuator based on the locus of movement determined by said movement locus determining means to move the vehicle, which is stopped at a starting position, to said target position; and a marker provided for stopping the vehicle at said starting position by a driver, wherein said marker is provided on the vehicle, and wherein said marker emits light or sound by operating a manual switch and said manual switch is a switch for selecting any of a plurality of loci of movement stored in said movement locus determining means.

2. An automatic steering apparatus for a vehicle according to claim 1, wherein when the vehicle starts to move from the starting position, emission of light or sound from said marker is stopped.

3. An automatic steering apparatus for a vehicle, comprising:

a movement locus determining means for one of storing and calculating a locus of movement of the vehicle to a target position;

an actuator for steering wheels of the vehicle;

a control means for controlling driving of said actuator based on the locus of movement determined by said movement locus determining means to move the vehicle, which is stopped at a starting position, to said target position; and a marker provided for stopping the vehicle at said starting position by a driver, wherein said marker is brought into a visually perceivable state by operating a manual switch and wherein when the vehicle starts to move from the starting position, the marker is brought into a visually non-perceivable state.

4. An automatic steering apparatus for a vehicle according to claim 3, wherein said manual switch is a switch for selecting any of a plurality of loci of movement stored in said movement locus determining means.

* * * * *